（12）United States Patent
Nakakita et al.

(10) Patent No.: US 11,916,397 B2
(45) Date of Patent: Feb. 27, 2024

(54) COMBINED ELECTRIC POWER GENERATIONS' SUPPLY SYSTEM IN OFF GRID INDEPENDENT OPERATION

(71) Applicant: MITSUBISHI HEAVY INDUSTRIES ENGINE & TURBOCHARGER, LTD., Sagamihara (JP)

(72) Inventors: Osamu Nakakita, Sagamihara (JP); Masayuki Tanaka, Sagamihara (JP); Hiroyuki Suzuki, Sagamihara (JP); Hirotaka Uehara, Sagamihara (JP); Masato Mitsuhashi, Tokyo (JP); Fujio Eguchi, Sagamihara (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 303 days.

(21) Appl. No.: 17/426,579

(22) PCT Filed: Aug. 29, 2019

(86) PCT No.: PCT/JP2019/033974
§ 371 (c)(1),
(2) Date: Jul. 28, 2021

(87) PCT Pub. No.: WO2020/158029
PCT Pub. Date: Aug. 6, 2020

(65) Prior Publication Data
US 2022/0166224 A1 May 26, 2022

(30) Foreign Application Priority Data
Feb. 1, 2019 (JP) .................. 2019-017466

(51) Int. Cl.
*H02J 3/46* (2006.01)
*H02J 3/32* (2006.01)
*H02P 9/02* (2006.01)

(52) U.S. Cl.
CPC .............. *H02J 3/46* (2013.01); *H02J 3/32* (2013.01); *H02P 9/02* (2013.01); *H02J 2300/22* (2020.01)

(58) Field of Classification Search
CPC . H02J 3/46; H02J 3/32; H02J 2300/22; H02P 9/02
See application file for complete search history.

(56) References Cited

U.S. PATENT DOCUMENTS

| 2015/0357820 | A1* | 12/2015 | Sugimoto | H02M 7/04 |
| | | | | 307/52 |
| 2016/0006338 | A1 | 1/2016 | Sakimoto et al. | |
| 2017/0047861 | A1 | 2/2017 | Sakimoto et al. | |

FOREIGN PATENT DOCUMENTS

| CN | 102792545 A | 11/2012 |
| CN | 106026196 A | 10/2016 |

(Continued)

OTHER PUBLICATIONS

International Search Report for International Appication No. PCT/JP2019/033974, dated Oct. 8, 2019, with English translation.

(Continued)

*Primary Examiner* — Jeffrey M Shin
(74) *Attorney, Agent, or Firm* — BIRCH, STEWART, KOLASCH & BIRCH, LLP (57) ABSTRACT

A combined electric power generations' supply system includes an AC power generator that supplies power by off grid independent operation, a DC power supply device, an inverter that converts DC power output by the DC power supply device into AC power. The rotation calculation unit calculates a value relating to a rotation of a rotor when driving the virtual power generator according to an active power command based on a rotor model calculates a value relating to the rotation of the rotor of the virtual power generator and the active power command. The output determination unit determines values relating to an active power and a reactive power to be output to the inverter based on the calculated value relating to the rotation. The modulation control unit performs control of a pulse width modulation of (Continued)

the inverter based on the determined value relating to the active power and reactive power. A time constant relating to synchronization power of the rotor model matches a time constant relating to synchronization power with the AC power generator.

6 Claims, 5 Drawing Sheets

(56) References Cited

FOREIGN PATENT DOCUMENTS

| | | |
|---|---|---|
| CN | 106684921 A | 5/2017 |
| CN | 106712115 A | 5/2017 |
| CN | 109066793 A | 12/2018 |
| EP | 2 546 971 A1 | 1/2013 |
| JP | 2007-244068 A | 9/2007 |
| JP | 2009-81942 A | 4/2009 |
| JP | 2009-225599 A | 10/2009 |
| JP | 2015-211617 A | 11/2015 |

OTHER PUBLICATIONS

Written Opinion of the International Searching Authority for International Application No. PCT/JP2019/033974, dated Oct. 8, 2019, with English translation.
Hirase et al., "A novel control approach for virtual synchronous generators to suppress frequency and voltage fluctuations in microgrids," Applied Energy, vol. 210, 2018, pp. 699-710, 12 pages total.

\* cited by examiner

COMBINED ELECTRIC POWER GENERATIONS' SUPPLY SYSTEM IN OFF GRID INDEPENDENT OPERATION

TECHNICAL FIELD

The present invention relates to a combined electric power generations' supply system in off grid independent operation.

Priority is claimed on Japanese Patent Application No. 2019-017466, filed Feb. 1, 2019, the content of which is incorporated herein by reference.

BACKGROUND ART

Patent Document 1 discloses a distributed power supply system including power generators that perform a grid-connected operation or an off grid independent operation. According to Patent Document 1, in the distributed power supply system, one power generator performs a rotation speed control with isochronous characteristics, and the remaining power generators perform the rotation speed control by droop characteristics during the off grid independent operation.

CITATION LIST

Patent Document

[Patent Document 1]
Japanese Unexamined Patent Application, First Publication No. 2009-081942

SUMMARY OF INVENTION

Technical Problem

Incidentally, a power supply system is known, in which a combination of a DC power supply device such as an electricity storage device or a renewable energy power generation device and an inverter (power conditioner) is connected to a bus provided with an AC power generator that operates autonomously. The AC power generator performs a rotation speed control by droop characteristics. However, when a power supply system having an AC power generator is operated autonomously, the frequency of bus voltage tends to fluctuate due to a fluctuation of a load. Therefore, when the voltage frequency of the AC power generator fluctuates, the inverter is likely to be disconnected from the linked state.

An object of the present invention is to provide a combined electric power generations' supply system and a control method thereof that can suppress the occurrence of disconnection of the DC power supply device due to the fluctuation of the load in the combined electric power generations' supply system including an AC power generator and a DC power supply device.

Solution to Problem

In order to achieve the aforementioned object, according to a first aspect of the present invention, a control device of an inverter is a control device that controls the inverter of a DC power supply device connected to the same bus as that of the AC power generator that supplies power by off grid independent operation. The control device includes a rotation calculation unit configured to calculate a value relating to a rotation of a rotor of a virtual power generator when the virtual power generator is driven according to an active power command based on a rotor model that simulates driving of the virtual power generator and calculates a value relating to the rotation of the rotor of the virtual power generator and the active power command, an output power determination unit configured to determine an active power and a reactive power to be output to the inverter based on the calculated value relating to the rotation, and a modulation control unit configured to perform control of a pulse width modulation of the inverter based on the determined active power and the reactive power. The time constant relating to synchronization power of the rotor model matches a time constant relating to synchronization power with the AC power generator.

According to a second aspect of the present invention, the control device of the inverter according to the first aspect may further include a drive torque calculation unit configured to calculate a value relating to a drive torque of the virtual power generator by inputting the voltage frequency of the bus, the frequency command and the active power command for the inverter into a governor model that determines a value relating to a drive torque of the virtual power generator based on the active voltage of the bus, the frequency command, and the active power command. The rotation calculation unit may calculate the rotation frequency of the virtual power generator based on the calculated value relating to the drive torque and the rotor model.

According to a third aspect of the present invention, in the control device of the inverter according to the second aspect, the time constant relating to a droop filter in the governor model may match a time constant relating to a droop filter in a governor of the AC power generator.

According to a fourth aspect of the present invention, the control device of the inverter according to any one of the first to third aspects may further include a field voltage calculation unit configured to calculate a value relating to a field voltage of the virtual power generator by inputting the bus voltage and the reactive power command for the inverter into an automatic voltage regulator model that determines a value relating to the field voltage of the virtual power generator based on the bus voltage and a reactive power command. The output power determination unit may be configured to determine the active power and reactive power based on the calculated value relating to the rotation and the value relating to the field voltage.

According to a fifth aspect of the present invention, in the control device of the inverter according to any one of the first to fourth aspects, the DC power supply device may be an electricity storage device or a renewable energy power generation device.

According to a sixth aspect of the present invention, an inverter is an inverter of the DC power supply device connected to the same bus as that of the AC power generator that supplies the power by off grid independent operation. The inverter includes a rotation calculation unit configured to calculate a value relating to a rotation of a rotor of a virtual power generator when the virtual power generator is driven according to an active power command based on a rotor model that simulates driving of the virtual power generator and calculates a value relating to the rotation of the rotor of the virtual power generator and the active power command, an output power determination unit configured to determine an active power and a reactive power to be output based on the calculated value relating to the rotation, and a modulation control unit configured to perform control of a pulse width modulation based on the determined active power and the reactive power. The time constant relating to synchronization power of the rotor model matches a time constant relating to synchronization power with the AC power generator.

According to a seventh aspect of the present invention, a control method of an inverter is a control method of the inverter that is an inverter of the DC power supply device connected to the same bus as that of the AC power generator that supplies the power by off grid independent operation. The method includes: a step of calculating a value relating to a rotation of a rotor of a virtual power generator when the virtual power generator is driven according to an active power command based on a rotor model that simulates driving of the virtual power generator and calculates a value relating to the rotation of the rotor of the virtual power generator and the active power command; a step of determining an active power and a reactive power to be output to the inverter based on the calculated value relating to the rotation; and a step of performing control of a pulse width modulation of the inverter based on the determined active power and the reactive power. A time constant relating to synchronization power of the rotor model matches a time constant relating to synchronization power with the AC power generator.

According to an eighth aspect of the present invention, a program causes a computer of an inverter of the DC power supply device connected to the same bus as that of the AC power generator that supplies power by off grid independent operation to execute a step of calculating a value relating to a rotation of a rotor of the virtual power generator when the virtual power generator is driven according to an active power command based on a rotor model that simulates driving of the virtual power generator and calculates a value relating to the rotation of the rotor of the virtual power generator and the active power command; a step of determining an active power and a reactive power to be output to the inverter based on the calculated value relating to the rotation; and a step of performing control of a pulse width modulation of the inverter based on the determined active power and the reactive power. A time constant relating to synchronization power of the rotor model matches a time constant relating to synchronization power with the AC power generator.

Advantageous Effects of Invention

According to at least one of the aspects described above, the inverter can suppress the occurrence of disconnection of the DC power supply device due to the fluctuation of the load in the power supply system including the AC power generator and the DC power supply device.

DESCRIPTION OF EMBODIMENTS

First Embodiment

Figure 1:
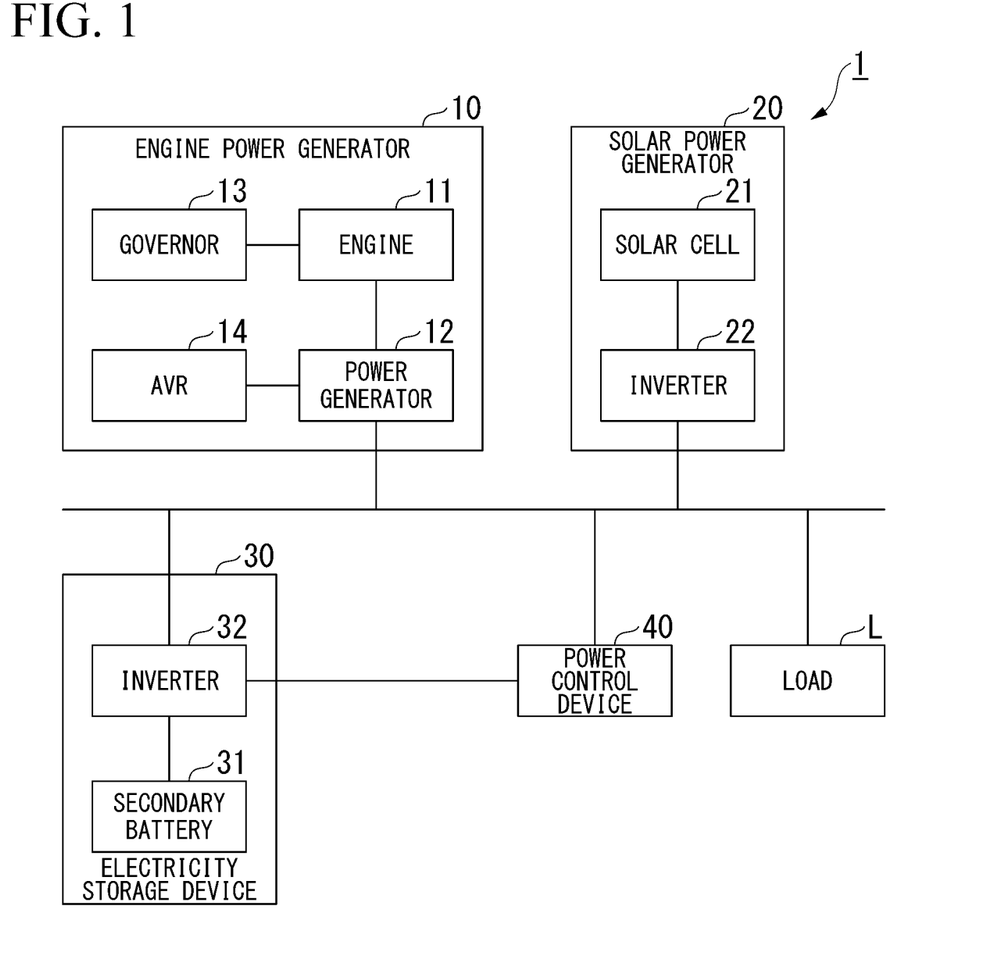
FIG. 1 is a schematic block diagram showing a configuration of a power supply system according to a first embodiment.

FIG. 1 is a schematic block diagram showing a configuration of a power supply system according to a first embodiment.

«Configuration of Power Supply System»

A power supply system 1 according to a first embodiment is a combined electric power generations' supply system that includes an engine power generator 10, a solar power generator 20, an electricity storage device 30, and a power control device 40. The power supply system 1 supplies power to a load L by an off grid independent operation. That is, the power supply system 1 is a so-called micro-grid system or an off-grid system. The engine power generator 10, the solar power generator 20, and the electricity storage device 30 are connected to a bus and supply the power to the load L via the bus.

The engine power generator 10 includes an engine 11, a power generator 12, a governor 13, and an automatic voltage regulator (AVR) 14. The engine power generator 10 is an AC power generator that generates AC power by driving the power generator 12 by rotating the engine 11.

The governor 13 controls a rotation speed of the engine 11 by the Hz-kW droop characteristic. The governor characteristic of the engine power generator 10 is represented, for example, by a slope of a linear function connecting plots relating to a rated output and a rated frequency and plots relating to a set frequency that is set in a no-load state when the load is cut off from the zero output and the rated output. That is, the Hz-kW droop characteristic is a characteristic in which the output decreases as the frequency increases. In other embodiments, the governor characteristic may be realized by a proportional integral differential (PID) control. The AVR 14 controls a current supplied to field winding of the power generator 12 by the V-kVar droop characteristic to adjust a terminal voltage of the power generator 12. The V-kVar droop characteristic is a characteristic in which a reactive power decreases as the voltage increases. In other embodiments, another AC power generator may be used instead of the engine power generator 10.

The solar power generator 20 includes a solar cell 21 and an inverter 22. The solar cell 21 is a DC power supply device that converts sunlight into DC power. The inverter 22 converts the DC power generated by the solar cell 21 into AC power. The inverter 22 and the solar cell 21 do not necessarily need to be provided in pair. For example, some solar cells 21 may be connected to one inverter 22. In other embodiments, other renewable energy power generators such as wind power generators may be used instead of the solar cell 21.

The electricity storage device 30 includes a secondary battery 31 and an inverter 32. The inverter 32 is a current control type inverter that converts the DC power output from the secondary battery 31 into AC power and supplies the AC power to the bus based on the command from the power control device 40. In addition, the inverter 32 converts a part of the AC power flowing through the bus into the DC power based on the command from the power control device 40, and charges the secondary battery 31. As the secondary battery 31, for example, a lithium ion secondary battery can be used. The inverter 32 and the secondary battery 31 do not necessarily need to be provided in pair. For example, some secondary batteries 31 may be connected to one inverter 32.

The power control device 40 monitors a value of power in the bus, issues a power generation command to the engine power generator 10, and outputs a charge and discharge command to the electricity storage device 30. For example, the power control device 40 outputs a power generation command to the engine power generator 10 to reduce or stop the power generation when the power generated by the solar power generator 20 is equal to or more than a predetermined threshold value, such as in the daytime. In addition, the power control device 40 outputs a power generation command for increasing the power generation to the engine power generator 10 when the power generated by the solar power generator 20 is less than the predetermined threshold value such as at night or in bad weather.

In addition, for example, the power control device 40 outputs the charge and discharge command for smoothing the fluctuation of the power generation by the solar power generator 20 to the inverter 32. In addition, the power control device 40 compares the sum of the value of power supplied to the bus with a demand value of power by the load L, and outputs the charge and discharge command to the inverter 32 based on a power difference.

«Inverter of Electricity Storage Device»

Figure 2:
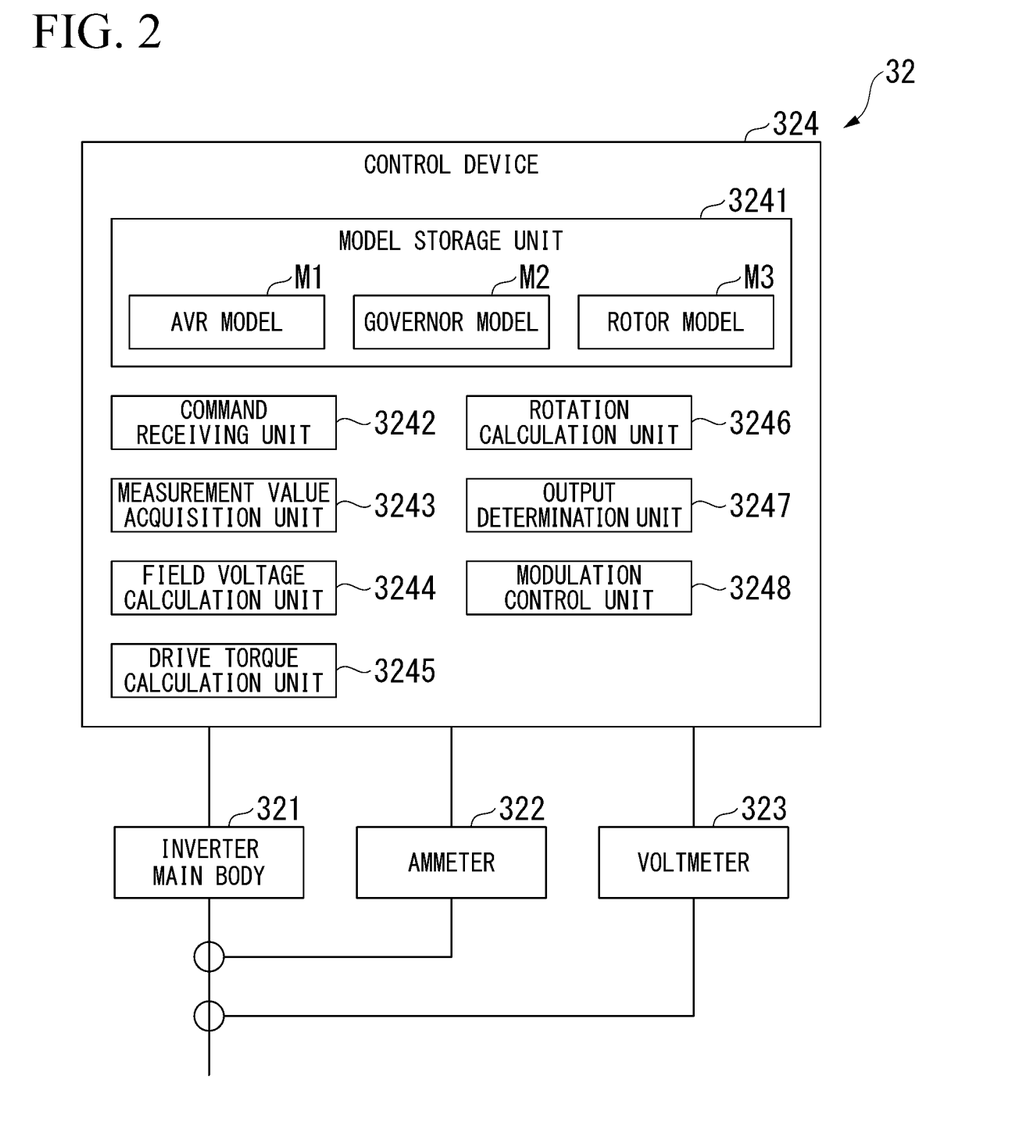
FIG. 2 is a schematic block diagram showing a configuration of an inverter of an electricity storage device according to the first embodiment.

FIG. 2 is a schematic block diagram showing a configuration of an inverter of an electricity storage device according to the first embodiment.

The inverter 32 according to the first embodiment includes an inverter main body 321, an ammeter 322, a voltmeter 323, and a control device 324. The ammeter 322 measures a current at an output end of the inverter main body 321. The voltmeter 323 measures a voltage at the output end of the inverter main body 321. The control device 324 controls the inverter main body 321 based on the measurement values by the ammeter 322 and the voltmeter 323.

The control device 324 includes a model storage unit 3241, a command receiving unit 3242, a measurement value acquisition unit 3243, a field voltage calculation unit 3244, a drive torque calculation unit 3245, a rotation calculation unit 3246, an output determination unit 3247, and a modulation control unit 3248.

The model storage unit 3241 stores a mathematical model that simulates a behavior of a virtual power generator. Specifically, the model storage unit 3241 stores an AVR model M1 that simulates the behavior of the AVR of the virtual power generator, a governor model M2 that simulates the behavior of the governor of the virtual power generator, and a rotor model M3 that simulates the behavior of the rotor of the virtual power generator. The AVR model M1 outputs the field voltage and the electric torque of the virtual power generator by inputting the measurement value of the reactive power, the reactive power command value, the actual voltage value, and the voltage command value. The governor model M2 outputs a drive torque value of the virtual power generator by inputting a measurement value of the active power, an active power command value, an angular velocity of the rotor of the virtual power generator, and an angular velocity command value. The rotor model M3 outputs an angular velocity and phase angle of the rotor of the virtual power generator by inputting an electric torque value and the drive torque value of the virtual power generator. Details of each mathematical model will be described later.

The command receiving unit 3242 receives the charge and discharge command from the power control device 40. The discharge command includes an active power command value, a reactive power command value, a voltage command value, and an angular velocity command value.

The measurement value acquisition unit 3243 acquires the measurement values by the ammeter 322 and the voltmeter 323. In addition, the measurement value acquisition unit 3243 calculates a voltage value and a current value that contribute to the active power, a voltage value and a current value that contribute to the reactive power, an actual voltage value, an active power value, and a reactive power value based on the measurement values by the ammeter 322 and the voltmeter 323.

The field voltage calculation unit 3244 inputs the reactive power command value and the voltage command value received by the command receiving unit 3242, and the reactive power value and actual voltage value acquired by the measurement value acquisition unit 3243 into the AVR model M1 to calculate a field voltage value and an electric torque value of the virtual power generator. The field voltage value and the electric torque value of the virtual power generator are examples of the values relating to the field voltage of the virtual power generator.

The drive torque calculation unit 3245 inputs the active power command value and the angular velocity command value received by the command receiving unit 3242, the measurement value of the active power acquired by the measurement value acquisition unit 3243, and the angular velocity of the rotor of the virtual power generator calculated by the rotation calculation unit 3246 in the previous control to the governor model M2, to calculate the drive torque value of the virtual power generator. The drive torque value is an example of a value relating to the drive torque of the virtual power generator.

The rotation calculation unit 3246 inputs the electric torque value calculated by the field voltage calculation unit 3244 and the drive torque value calculated by the drive torque calculation unit 3245 to the rotor model M3, to calculate the angular velocity of the rotor and the phase angle of the virtual power generator. The angular velocity of the rotor and the phase angle of the virtual power generator are examples of values relating to the rotation of the rotor of the virtual power generator.

The output determination unit 3247 determines the output active current and the output reactive current based on the field voltage value calculated by the field voltage calculation unit 3244, the voltage value and the current value that contribute to the active power acquired by the measurement value acquisition unit 3243 and the voltage value and the current value that contribute to the reactive power, and the phase angle of the rotor calculated by the rotation calculation unit 3246. For example, the output determination unit 3247 calculates an amount of change of the field voltage value calculated by the field voltage calculation unit 3244, the voltage and current that contribute to the active power and the voltage and current that contribute to the reactive power acquired by the measurement value acquisition unit 3243 based on an impedance of the virtual power generator. The output determination unit 3247 determines the output active current by adding the active current acquired by the measurement value acquisition unit 3243 to the amount of change of the active current. In addition, the output determination unit 3247 determines the output reactive current by adding the reactive current acquired by the measurement value acquisition unit 3243 to the amount of change of the reactive current. The output active current is an example of a value relating to the output active power. The output reactive current is an example of a value relating to the output reactive power.

The modulation control unit 3248 determines a duty ratio of a pulse width modulation of the inverter main body 321 based on the output active current and the output reactive current determined by the output determination unit 3247, and controls ON and OFF of a switching element (not shown) of the inverter main body 321.

«Configuration of Mathematical Model»

Figure 3:
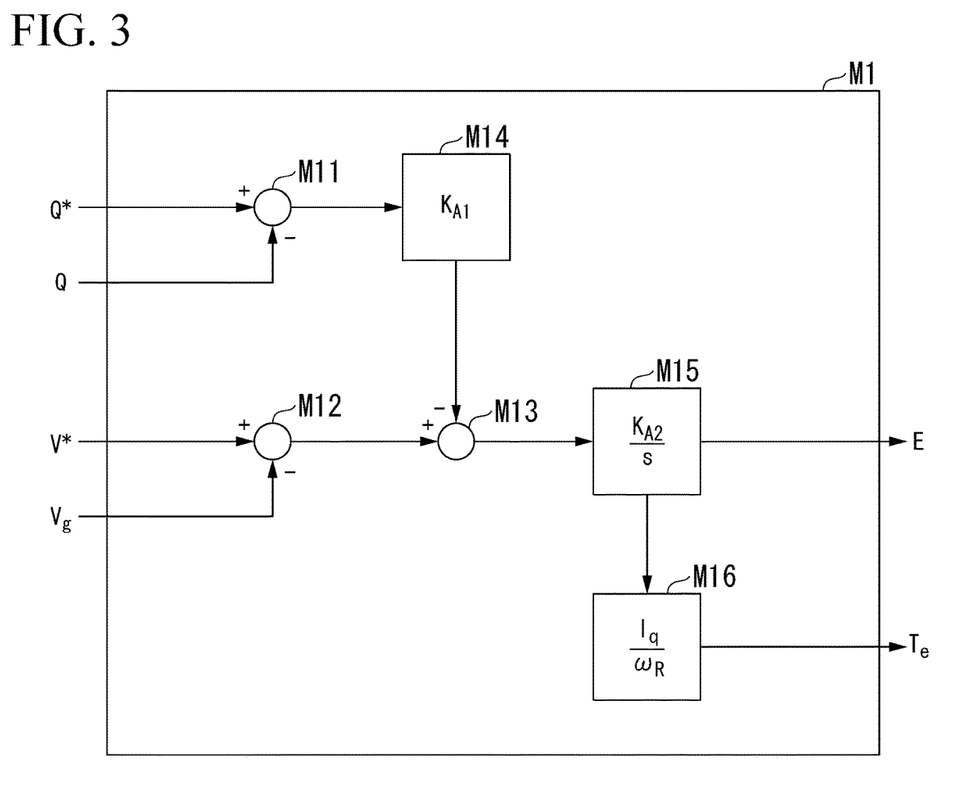
FIG. 3 is a block line diagram showing an example of an AVR model according to the first embodiment.

FIG. 3 is a block line diagram showing an example of the AVR model according to the first embodiment.

By inputting the measurement value Q of the reactive power, the reactive power command value Q*, the actual voltage value $V_g$, and the voltage command value V*, the AVR model M1 output the field voltage value E and the electric torque value $T_e$ of the virtual power generator. Specifically, the AVR model M1 includes addition points M11, M12, and M13, a P block M14, an I block M15, and a P block M16. At the addition point M11 obtains a difference between the measurement value Q of the reactive power and the reactive power command value Q*. The P block M14 performs a P control on the output of the addition point M11 by a proportional gain $K_{A1}$. The proportional gain $K_{A1}$ corresponds to a V-kVar droop gain of the virtual power generator. The addition point M12 obtains a difference between the actual voltage value $V_g$ and the voltage command value V*. The addition point M13 obtains a difference between the output of the addition point M12 and the output of the P block M14. The I block M15 performs an integral control on the output of the addition point M13 by an integral gain $K_{A2}$ to obtain the field voltage value E. The P block M16 multiplies the field voltage value E by the invalid current value $I_q$ and divides the result by the angular velocity $\omega_R$ of the rotor to obtain the electric torque $T_e$ of the virtual power generator.

Figure 4:
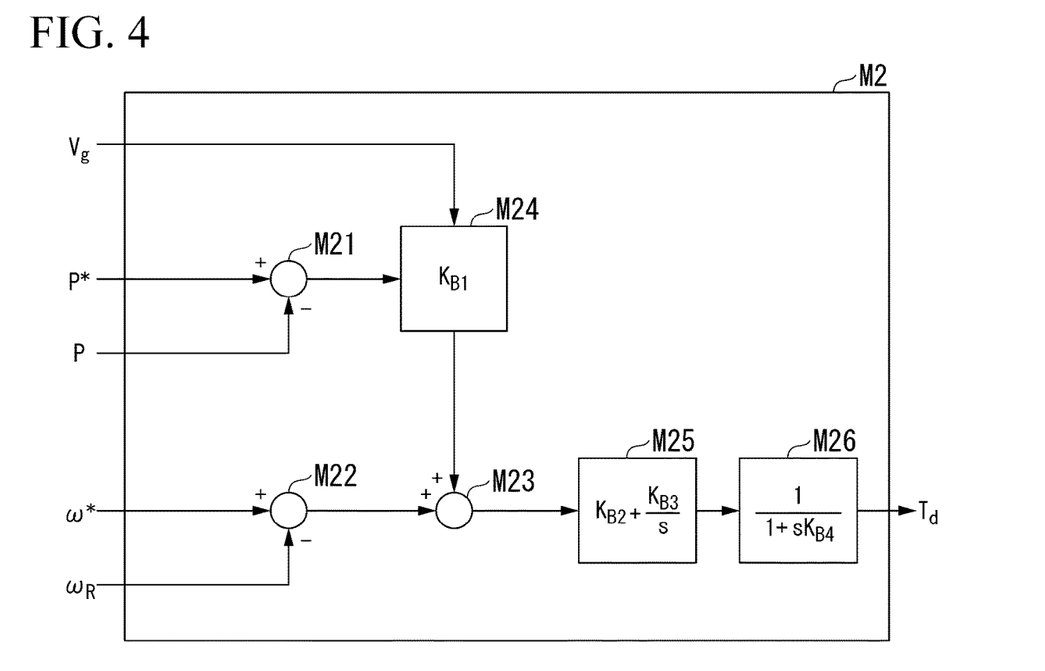
FIG. 4 is a block line diagram showing an example of a governor model according to the first embodiment.

FIG. 4 is a block line diagram showing an example of the governor model according to the first embodiment.

By inputting the measurement value P of the active power, the active power command value P*, the angular velocity $\omega_R$ of the rotor of virtual power generator, and the angular velocity command value ω*, the governor model M2 outputs the drive torque value $T_d$ of the virtual power generator. Specifically, the governor model M2 includes addition points M21, M22, and M23, a P block M24, a PI block M25, and a primary lag block M26. The addition point M21 obtains a difference between the measurement value P of the active power and the active power command value P*. The P block M24 performs a P control on the output of the addition point M21 by a proportional gain $K_{B1}$. The proportional gain $K_{B1}$ corresponds to a Hz-kW droop gain of the virtual power generator. In addition, the proportional gain $K_{B1}$ is determined by a voltage function that monotonically decreases with respect to the actual voltage value $V_g$. Therefore, the P block M24 determines the proportional gain $K_{B1}$ according to the V-kW droop characteristic based on the actual voltage value $V_g$, and calculates the P block M24. The addition point M22 obtains the difference between the angular velocity $\omega_R$ of the rotor and the angular velocity command value ω* of the virtual power generator. The addition point M23 obtains the sum of the output of the addition point M22 and the output of the P block M24. The PI block M25 performs a PI control on the output of the addition point M23 by the proportional gain $K_{B2}$ and the integral gain $K_{B3}$. The primary lag block M26 performs a primary lag control on the output of the PI block M25 by a time constant $K_{B4}$ to obtain a drive torque value $T_d$. The time constant $K_{B4}$ is the same as the time constant of governor 13. In the present specification, "the time constant is the same" and "the time constant matches" do not necessarily mean to be exactly the same, but includes a range of substantially matching (for example, the range of ±3 dB).

Figure 5:
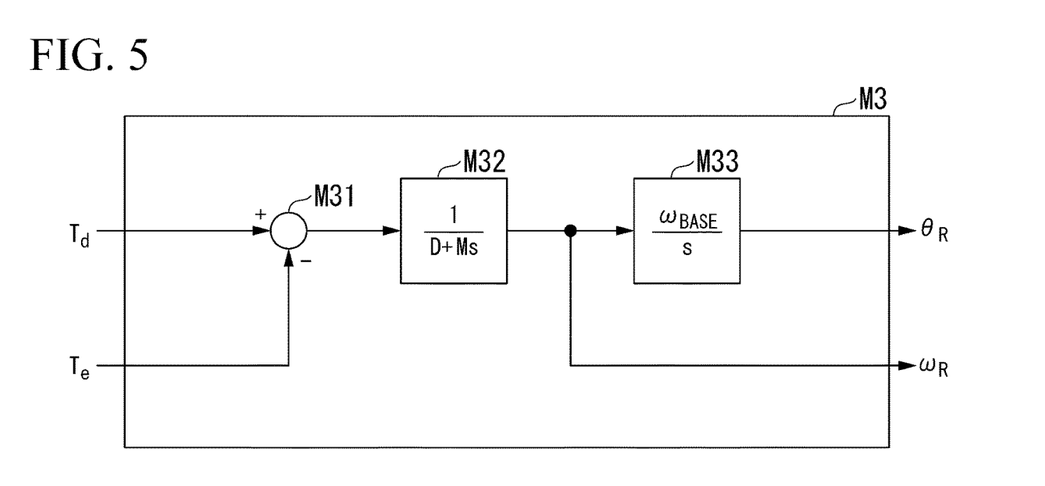
FIG. 5 is a block line diagram showing an example of a rotor model according to the first embodiment.

FIG. 5 is a block line diagram showing an example of the rotor model according to the first embodiment.

By inputting the electric torque value $T_e$ and drive torque value $T_d$ of the virtual power generator, the rotor model M3 outputs the angular velocity $\omega_R$ of the rotor and the phase angle $\theta_R$ of the virtual power generator. Specifically, the rotor model M3 includes an addition point M31, a primary lag block M32, and an I block M33. The addition point M31 obtains a difference between the electric torque $T_e$ and the drive torque $T_d$ of the virtual power generator. The primary lag block M32 performs the primary lag control on the output of the addition point M31 by an integral gain M and a time constant D to obtain an angular velocity $\omega_R$ of the rotor. The time constant D is a braking coefficient relating to a braking force of the braking winding, and is the same as a braking coefficient of the power generator 12. In addition, the integral gain M is a gain corresponding to a moment of inertia of the rotor of the virtual power generator, and is the same as the moment of inertia of the rotor of engine 11. The I block M33 integrates the angular velocity $\omega_R$ of the rotor and multiplies the result by a proportional gain $\omega_{BASE}$ to obtain a phase $\theta_R$ of the rotor of the virtual power generator. The proportional gain $\omega_{BASE}$ is a reference frequency of the bus.

«Operation»

With the configuration described above, the control device 324 obtains the rotation angle and the field voltage value of the virtual power generator from the active power command value, the reactive power command value, the voltage command value, the angular velocity command value, and the measurement values by the ammeter 322 and the voltmeter 323, based on the AVR model M1, the governor model M2, and the rotor model M3. The control device 324 determines the output active current and the output reactive current from the rotation angle and field voltage value of the virtual power generator, and performs the control of the pulse width modulation of the inverter main body 321 based on the determined output active current and the output reactive current. As a result, the characteristics corresponding to the virtual power generator are realized in the inverter 32.

Here, the time constant of the virtual power generator according to the present embodiment is the same as the time constant of the engine power generator 10, but the V-kVar droop gain, the Hz-kW droop gain, an impedance, and the like do not necessarily need to be the same as those of the engine power generator 10. For example, by making the Hz-kW droop gain of the virtual power generator slower than the Hz-kW droop gain of the engine power generator 10, a burden of the active power by the inverter 32 due to the fluctuation of the load L can be made larger than that of the engine power generator 10. In addition, for example, by making the V-kVar droop gain of the virtual power generator steeper than the V-kVar droop gain of the engine power generator 10, the burden of the reactive power by the inverter 32 due to the fluctuation of the load L can be made to be smaller than that of the engine power generator 10.

«Action and Effects»

The control device 324 of the inverter 32 according to the first embodiment calculates the angular velocity of the rotor of the virtual power generator using the rotor model M3 having the same time constant relating to the synchronization power as that of the engine power generator 10, determines the voltage frequency based on the angular velocity, and performs the control of the pulse width modulation of the inverter 32. As described above, by matching the time constant relating to the synchronization power of the virtual power generator with that of the engine power generator 10 and determining the voltage frequency, the control device 324 can change the voltage frequency of the inverter 32 in accordance with the change of the voltage frequency of the engine power generator 10 when the load L fluctuates. As a result, the control device 324 according to the first embodiment can prevent the occurrence of the disconnection of the electricity storage device 30 due to the fluctuation of the load L in the power supply system 1.

In addition, according to the first embodiment, the control device 324 calculates the phase of the rotor of the virtual power generator using the rotor model M3 of which the time constant relating to the synchronization power is the same as that of the engine power generator 10, and performs the control of the pulse width modulation of the inverter 32 is based on the phase. As a result, in the power supply system 1, the control device 324 according to the first embodiment can make the fluctuation of the load L be shared by each of the engine power generator 10 and the electricity storage device 30.

In addition, the control device 324 of the inverter 32 according to the first embodiment calculates the drive torque value of the virtual power generator using the governor model M2. As a result, the control device 324 can control the active power of the inverter 32 by the Hz-kW droop characteristic and the V-kW droop characteristic. The control device 324 according to other embodiments may determine the drive torque value without depending on the governor model M2. In addition, the time constant of the governor model relating to the droop filter according to the first embodiment is the same as the time constant of the governor 13 of the engine power generator 10 relating to the droop filter. As a result, when the load L fluctuates, the control device 324 can change the output frequency of the inverter 32 in accordance with the change of the output frequency of the engine power generator 10.

In addition, the control device 324 of the inverter 32 according to the first embodiment calculates the field voltage value of the virtual power generator using the AVR model M1. As a result, the control device 324 can control the reactive power of the inverter 32 by the droop characteristic. The control device 324 according to other embodiments may control the reactive power without depending on the AVR model M1.

Other Embodiments

As above, one embodiment is described in detail with reference to the drawings, however, the specific configuration is not limited to the above description, and various design changes and the like can be made.

In the first embodiment, the inverter 32 of the electricity storage device 30 performs the control based on the virtual power generator, but other embodiments are not limited thereto. For example, in other embodiments, the inverter 22 of the solar power generator 20 may perform the control based on the virtual power generator. In this case, the solar power generator 20 needs to be provided with an electricity storage device capable of absorbing a difference between the generated power amount of the solar cell 21 and the output power amount of the inverter 22 caused by the inertia of the virtual power generator. In addition, in other embodiments, the above-described control may be performed on some of the inverters 32 among the plurality of inverters 32, and the normal control may be performed on the other inverters 32 among the plurality of inverters 32.

In the first embodiment, the rotation calculation unit 3246 calculates the phase of the rotor as the values relating to the rotation of the rotor, but the present invention is not limited thereto. For example, in other embodiments, the rotation calculation unit 3246 may calculate other values such as the angular velocity, the rotation frequency, and the rotation speed of the rotor. In addition, in the first embodiment, the drive torque calculation unit 3245 calculates the drive torque value as the value relating to the drive torque of the virtual power generator, but the present invention is not limited thereto. For example, in other embodiments, the drive torque calculation unit 3245 may calculate other values such as the rotational force of the rotor. In addition, in the first embodiment, the field voltage calculation unit 3244 calculates the field voltage value as the value relating to the field voltage of the virtual power generator, but the present invention is not limited thereto. For example, in other embodiments, the field voltage calculation unit 3244 may calculate other values relating to the field current of the virtual power generator.

In addition, in the first embodiment, the calculations are performed using the mathematical model shown in FIG. 3 to FIG. 5, but the present invention is not limited thereto. For example, in other embodiments, the calculation may be performed based on the engine power generator 10 represented by a PARK model.

<Configuration of Computer>

Figure 6:
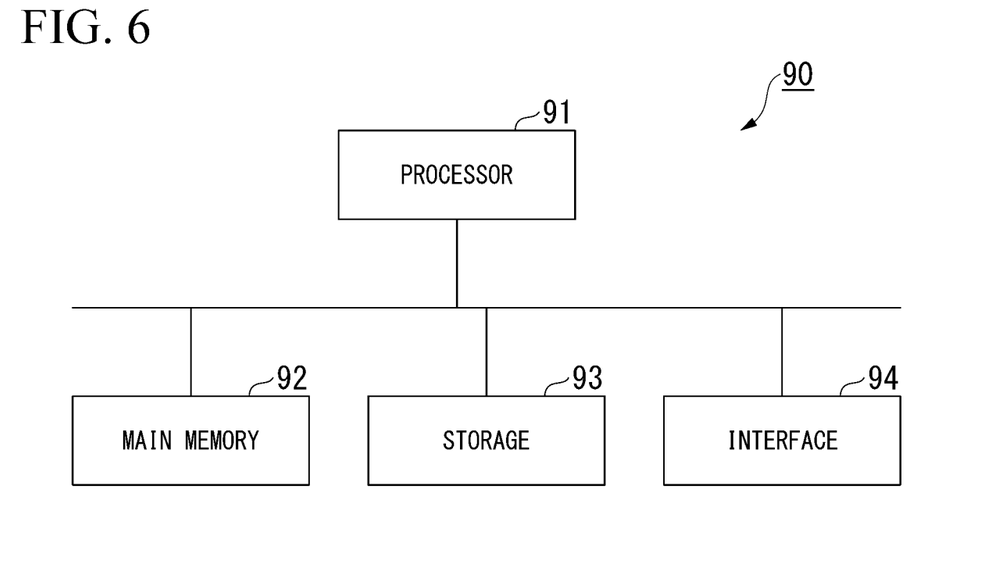
FIG. 6 is a schematic block diagram showing a configuration of a computer according to at least one embodiment.

FIG. 6 is a schematic block diagram showing a configuration of a computer according to at least one embodiment.

A computer 90 includes a processor 91, a main memory 92, a storage 93, and an interface 94.

The control device 324 described above is mounted in computer 90. The operation of each processing unit described above is stored in the storage 93 in a form of a program. The processor 91 reads the program from the storage 93, loads the program into the main memory 92, and executes the above-described processing according to the program. In addition, the processor 91 secures a storage area corresponding to each of the above-described storage units in the main memory 92 according to the program.

The program may realize a part of the functions that are performed by the computer 90. For example, the program may perform the functions in combination with another program already stored in the storage 93 or in combination with another program mounted on another device. In other embodiments, the computer 90 may include a custom large scale integrated circuit (LSI) such as a programmable logic device (PLD) in addition to or instead of the configuration described above. Examples of the PLDs include a programmable array logic (PAL), a generic array logic (GAL), a complex programmable logic device (CPLD), and a field programmable gate array (FPGA). In this case, all or a part of the functions realized by the processor may be realized by the integrated circuit.

Examples of the storage 93 include a hard disk drive (HDD), a solid state drive (SSD), a magnetic disk, an optical magnetic disk, a compact disc read only memory (CD-ROM), a digital versatile disc read only memory (DVD-ROM), a semiconductor memory, and the like. The storage 93 may be the internal media directly connected to the bus of the computer 90, or may be the external media connected to the computer 90 via the interface 94 or a communication line. Also, if the program is distributed to the computer 90 via a communication line, the computer 90 that received the distribution may load the program into the main memory 92 to execute the processing described above. In at least one embodiment, the storage 93 is a non-temporary tangible storage medium.

In addition, the program may realize a part of the functions described above. Furthermore, the program may be a so-called difference file (difference program) that realizes the functions described above in combination with another program already stored in the storage 93.

INDUSTRIAL APPLICABILITY

In a power supply system including an AC power generator and a DC power supply device, the inverter described above can suppress the occurrence of disconnection of the DC power supply device due to fluctuation of the load.

REFERENCE SIGNS LIST

1: power supply system
10: engine power generator
11: engine
12: power generator
13: governor
14: AVR
20: solar power generator
21: solar cell
22: inverter
30: electricity storage device
31: secondary battery
32: inverter
321: inverter main body
322: ammeter
323: voltmeter
324: control device
3241: model storage unit
3242: command receiving unit
3243: measurement value acquisition unit
3244: field voltage calculation unit
3245: drive torque calculation unit
3246: rotation calculation unit
3247: output determination unit
3248: modulation control unit
40: power control device
M1: AVR model
M2: governor model
M3: rotor model

What is claimed is:

1. A combined electric power generations' supply system comprising:
an AC power generator configured to supply electric power by off grid independent operation;
a DC power supply device;
an inverter connected to the same bus as the AC power generator and configured to convert DC power output by the DC power supply device into AC power; and
a control device configured to control the inverter,
wherein the control device includes:
a rotation calculation unit configured to calculate a value relating to a rotation of a rotor of a virtual power generator when the virtual power generator is driven according to an active power command based on a rotor model that simulates driving of the virtual power generator and calculates a value relating to the rotation of the rotor of the virtual power generator and the active power command;
a field voltage calculation unit configured to calculate a value relating to a field voltage of the virtual power generator by inputting the bus voltage and a reactive power command for the inverter to an Automatic Voltage Regulator (AVR) model that determines a value relating to the field voltage of the virtual power generator based on the bus voltage and the reactive power command;
an output determination unit configured to determine a value relating to a voltage frequency, a value relating to an active power, and a value relating to a reactive power to be output to the inverter based on the calculated value relating to the rotation and the value relating to the field voltage; and
a modulation control unit configured to perform control of a pulse width modulation of the inverter based on the determined voltage frequency, active power, and reactive power,
wherein a time constant relating to synchronization power of the rotor model matches a time constant relating to synchronization power with the AC power generator, and
wherein a droop gain of the AVR model is different from a droop gain of the AC power generator.

2. The combined electric power generations' supply system according to claim 1,
wherein the output determination unit is configured to determine a value relating to an active power to be output to the inverter based on the calculated value relating to the rotation, and
wherein the modulation control unit is configured to perform the control of the pulse width modulation of the inverter based on the determined value relating to the active power and the voltage frequency.

3. The combined electric power generations' supply system according to claim 1,
wherein the DC power supply device is an electricity storage device or a renewable energy power generation device.

4. A combined electric power generations' supply system comprising:
an AC power generator configured to supply electric power by off grid independent operation:
a DC power supply device;
an inverter connected to the same bus as the AC power generator and configured to convert DC power output by the DC power supply device into AC power; and
a control device configured to control the inverter,
wherein the control device includes:
a rotation calculation unit configured to calculate a value relating to a rotation of a rotor of a virtual power generator when the virtual power generator is driven according to an active power command based on a rotor model that simulates driving of the virtual power generator and calculates a value relating to the rotation of the rotor of the virtual power generator and the active power command;
an output determination unit configured to determine a value relating to a voltage frequency to be output to the inverter based on the calculated value relating to the rotation; and
a modulation control unit configured to perform control of a pulse width modulation of the inverter based on the determined voltage frequency,
wherein a time constant relating to synchronization power of the rotor model matches a time constant relating to synchronization power with the AC power generator,
wherein the control device includes a drive torque calculation unit configured to calculate a value relating to a drive torque of the virtual power generator by inputting a voltage frequency and an actual voltage of the bus and a frequency command and an active power command for the inverter, into a governor model that determines a value relating to a drive torque of the virtual power generator based on the active power of the bus, the frequency command, the active power command, and the actual voltage of the bus, and wherein the rotation calculation unit is configured to calculate a value relating to the rotation of the virtual power generator based on the calculated value relating to the drive torque and the rotor model.

5. The combined electric power generations' supply system according to claim 4, wherein a time constant relating to a droop filter in the governor model matches a time constant relating to a droop filter in a governor of the AC power generator.

6. A control method for a combined electric power generations' supply system that includes:

an AC power generator configured to supply electric power by off grid independent operation, a DC power supply device, and an inverter connected to the same bus as the AC power generator and configured to convert DC power output by the DC power supply device into AC power, the method comprising:

a step of calculating a value relating to a rotation of a rotor of the virtual power generator when the virtual power generator is driven according to an active power command based on a rotor model that simulates driving of the virtual power generator and calculates a value relating to the rotation of the rotor of the virtual power generator and the active power command;

a step of calculating a value relating to a field voltage of the virtual power generator by inputting the bus voltage and a reactive power command for the inverter to an Automatic Voltage Regulator (AVR) model that determines a value relating to the field voltage of the virtual power generator based on the bus voltage and the reactive power command;

a step of determining a value relating to a voltage frequency, a value relating to an active power, and a value relating to a reactive power to be output to the inverter based on the calculated value relating to the rotation and the value relating to the field voltage; and a step of performing control of a pulse width modulation of the inverter based on the determined voltage frequency, active power, and reactive power, wherein a time constant relating to synchronization power of the rotor model matches a time constant relating to synchronization power with the AC power generator, and wherein a droop gain of the AVR model is different from a droop gain of the AC power generator.

* * * * *